US006982829B1

(12) United States Patent
Berman

(10) Patent No.: US 6,982,829 B1
(45) Date of Patent: Jan. 3, 2006

(54) PRISM ASSEMBLY WITH CHOLESTERIC REFLECTORS

(75) Inventor: Arthur Berman, San Jose, CA (US)

(73) Assignee: LightMaster Systems, Inc, Cupertino, CA (US)

( * ) Notice: Subject to any disclaimer, the term of this patent is extended or adjusted under 35 U.S.C. 154(b) by 0 days.

(21) Appl. No.: 10/646,291

(22) Filed: Aug. 22, 2003

Related U.S. Application Data

(60) Provisional application No. 60/405,462, filed on Aug. 23, 2002.

(51) Int. Cl.
G02B 5/30 (2006.01)
(52) U.S. Cl. .......................... 359/495; 349/8; 349/115; 353/20; 359/833
(58) Field of Classification Search ................ 359/495, 359/494, 496, 497, 500, 502, 485, 490; 349/5, 349/6, 7, 8, 9, 10, 113, 115, 162, 185, 194; 353/20, 34, 82, 84; 348/744, 750, 751, 752, 348/758
See application file for complete search history.

(56) References Cited

U.S. PATENT DOCUMENTS

| | | | |
|---|---|---|---|
| 1,277,040 A | 8/1918 | Brewster | 359/636 |
| 4,151,554 A | 4/1979 | Tucker | 348/749 |
| 4,544,237 A | 10/1985 | Gagnon | 349/9 |
| 4,913,528 A | 4/1990 | Hasegawa | 359/638 |
| 5,168,351 A | 12/1992 | Bradley | 348/780 |
| 5,177,629 A | 1/1993 | Bohannon | 349/74 |
| 5,497,268 A | 3/1996 | Tang | 359/513 |
| 5,552,922 A | 9/1996 | Magarill | 359/224 |
| 5,820,241 A * | 10/1998 | Wortel | 353/31 |
| 5,838,397 A | 11/1998 | Stephens | 349/5 |
| 5,865,520 A | 2/1999 | Kavanagh et al. | 353/31 |
| 5,986,814 A | 11/1999 | Reinsch | 359/634 |
| 6,046,858 A | 4/2000 | Scott et al. | 359/634 |
| 6,056,407 A | 5/2000 | Iinuma et al. | 353/119 |
| 6,089,719 A | 7/2000 | Lin | 353/33 |
| 6,115,484 A | 9/2000 | Bowker et al. | 382/127 |
| 6,139,154 A | 10/2000 | Haba | 353/31 |

(Continued)

FOREIGN PATENT DOCUMENTS

JP 04-005428 7/1933

(Continued)

OTHER PUBLICATIONS

M. Schadt, J. Funfschilling, 'New liquid crystal polarized color projection principle', Jap. J. Appl. Phys., vol. 29, No. 10, Oct. 1990, pp. 1974-1984.*

(Continued)

*Primary Examiner*—Thong Nguyen
*Assistant Examiner*—Arnel C. Lavarias
(74) *Attorney, Agent, or Firm*—John Carpenter; Reed Smith, LLP

(57) ABSTRACT

A beam splitter is constructed using one or more cholesteric layers. Each cholesteric layer reflects light of a given wavelength and polarization. The beam splitter is placed in a prism assembly. The cholesteric layers of the beam splitter are chosen such that portions of light entering the beam splitter are individually directed to a specific light path or to a processing face of the prism assembly. A microdisplay is mounted on each processing faces forms a kernel, and each microdisplay processes the light portions (light beams) directed toward them. Light beams reflected from the microdisplays have image content added to them from the microdisplays. The kernel is utilized in a light management system, such as that used in a video projection (e.g., projection television).

8 Claims, 8 Drawing Sheets

U.S. PATENT DOCUMENTS

| | | |
|---|---|---|
| 6,175,400 B1 | 1/2001 | Duncan et al. ............. 349/117 |
| 6,176,586 B1 | 1/2001 | Hirose et al. ................ 353/31 |
| 6,183,090 B1 * | 2/2001 | Nakanishi et al. ............ 353/20 |
| 6,183,091 B1 * | 2/2001 | Johnson et al. ............... 353/20 |
| 6,247,814 B1 | 6/2001 | Lin ............................ 353/20 |
| 6,262,851 B1 | 7/2001 | Marshall .................... 359/634 |
| 6,280,037 B1 | 8/2001 | Smith ......................... 353/31 |
| 6,288,844 B1 | 9/2001 | Edlinger et al. ............ 359/634 |
| 6,304,302 B1 | 10/2001 | Huang et al. .................. 349/9 |
| 6,309,071 B1 | 10/2001 | Huang et al. ................ 353/31 |
| 6,364,488 B1 | 4/2002 | Lin ............................. 353/31 |
| 6,366,335 B1 | 4/2002 | Hikmet et al. ............. 349/193 |
| 6,375,330 B1 | 4/2002 | Mihalakis ................... 353/31 |
| 6,377,318 B1 | 4/2002 | Menard ..................... 348/745 |
| 6,406,151 B1 | 6/2002 | Fujimori .................... 353/119 |
| 6,407,868 B1 | 6/2002 | Ishibashi et al. ........... 359/634 |
| 6,415,093 B1 | 7/2002 | Nakamura et al. .......... 385/141 |
| 6,419,362 B1 | 7/2002 | Ikeda et al. .................. 353/20 |
| 6,454,416 B2 | 9/2002 | Aoto et al. ................... 353/31 |
| 6,476,972 B2 | 11/2002 | Edlinger et al. ............ 359/634 |
| 6,490,087 B1 | 12/2002 | Fulkerson et al. .......... 359/487 |
| 6,509,938 B2 | 1/2003 | Okada et al. .................. 349/5 |
| 6,522,470 B2 | 2/2003 | De Vaan et al. ............ 359/618 |
| 6,530,663 B2 | 3/2003 | Lin ............................. 353/33 |
| 6,563,553 B1 * | 5/2003 | Faris ............................. 349/5 |
| 2001/0024556 A1 | 9/2001 | Beguin et al. |
| 2002/0001135 A1 | 1/2002 | Berman et al. |
| 2002/0109820 A1 | 8/2002 | Pan |
| 2002/0140905 A1 | 10/2002 | Ouchi et al. |
| 2002/0176054 A1 | 11/2002 | Mihalakis |
| 2003/0117593 A1 | 6/2003 | Abe et al. |
| 2003/0147051 A1 | 8/2003 | Fujita et al. |
| 2005/0041289 A1 * | 2/2005 | Berman ..................... 359/495 |

FOREIGN PATENT DOCUMENTS

| | | |
|---|---|---|
| JP | 54-155153 | 6/1981 |
| JP | 04-031676 | 9/1993 |
| JP | 04-151008 | 12/1993 |
| JP | 07-041358 | 8/1996 |

OTHER PUBLICATIONS

Robinson et al., (2000) "High Contrast Color Splitting Architecture Using Polarization Filters," *SID '00 Digest*, vol. 31.

* cited by examiner

PRISM ASSEMBLY WITH CHOLESTERIC REFLECTORS

CLAIM OF PRIORITY

This invention claims priority to the following U.S. provisional patent application:

Berman, Provisional Application Ser. No. 60/405,462, entitled "PRISM ASSEMBLY WITH CHOLESTERIC REFLECTORS," filed, Aug. 23, 2002.

BACKGROUND OF THE INVENTION

1. Field of Invention

The present invention relates generally to optical systems, and more specifically to optical systems used in video and other projection systems.

2. Discussion of Background

The functionality of a video projector (illustrated containing a commercially available prism assembly) is explained with reference to FIG. 1A. As shown, white light is generated by the light source. The light is collected, homogenized and formed into the proper shape by the condenser. UV and IR components are eliminated by filters. The white light then enters the prism assembly where it is polarized and broken into red, green and blue beams. (Hence a "three channel" type prism assembly.) These beams then follow different paths within the prism assembly such that each beam is directed to a specific reflective microdisplay. The microdisplay that interacts with the green beam contains the green content of the full color video image. It is similar for the blue and red microdisplays. On a pixel by pixel basis, the microdisplays modulate and then reflect the colored light beams. The prism assembly then recombines the modulated beams into a white light beam that contains a full color video image. The resultant white light beam then exits the prism assembly and enters the projection lens. Finally, the image-containing beam is projected onto (in this case) the rear of a screen.

Some desirable properties of a prism assembly are that it produce an image in which the brightness and color are spatially uniform and meet other required optical properties including those for brightness, color gamut and contrast ratio. It is equally important that the prism assembly be manufacturable. That is, that the prism assembly be producible in high volume with good yield and at a high quality level. Finally, and of equal importance, is that the prism assembly meet cost targets. Targets that, for consumer products, are inevitably very challenging.

The configurations of several prism assemblies have been discussed in the technical literature. Included are the following:

Digital Reflection's Star Prism
Philip's Trichroic Prism
IBM's X-Prism+3 PBS
S-Vision/Aurora System's Off-Axis Prism
Digital Reflection's MG Prism
ColorLink's Color Quad Prism
Unaxis'Color Corner Prism
ITRI's Prism
Primax's X-Prism However, none of these prism assemblies fully meet all of the criteria discussed above. For this reason, LightMaster Systems has invented and developed a prism assembly according to the present invention that more fully meets these criteria. Details of the prism assembly according to the present invention are provided herein below.

SUMMARY OF THE INVENTION

The present inventors have discovered a number of advantages in prism systems that utilize cholesteric layers in one of more optical components of the prism systems. The invention relates particularly to video projection systems utilizing reflective microdisplays. More particularly, in one embodiment, the invention is a configuration of a prism assembly that is based on cholesteric optical components and is suitable for use within a "three channel" Liquid Crystal on Silicon (LCoS) video projector.

DESCRIPTION OF THE PREFERRED EMBODIMENTS

Each of the prism assemblies discussed herein include cholesteric layers. Technical details about the structure, construction, and operation of cholesteric layers is now discussed. The cholesteric layers are generally thin layers of cholesteric liquid crystal.

The cholesteric layers react with light in a unique way that the present invention takes advantage of to produce efficient prism assemblies. The molecular structure of a cholesteric is such that it interacts with light by either passing or reflecting light of a given wavelength band and polarization. Cholesterics can be produced to either pass or reflect light at the given wavelength and polarization for various polarizations and wavelengths of light (e.g., a "red" cholesteric that reflects light in the red light bandwidth, or a "green" cholesteric that reflects light in the green light bandwidth, for example).

Figure 1A:
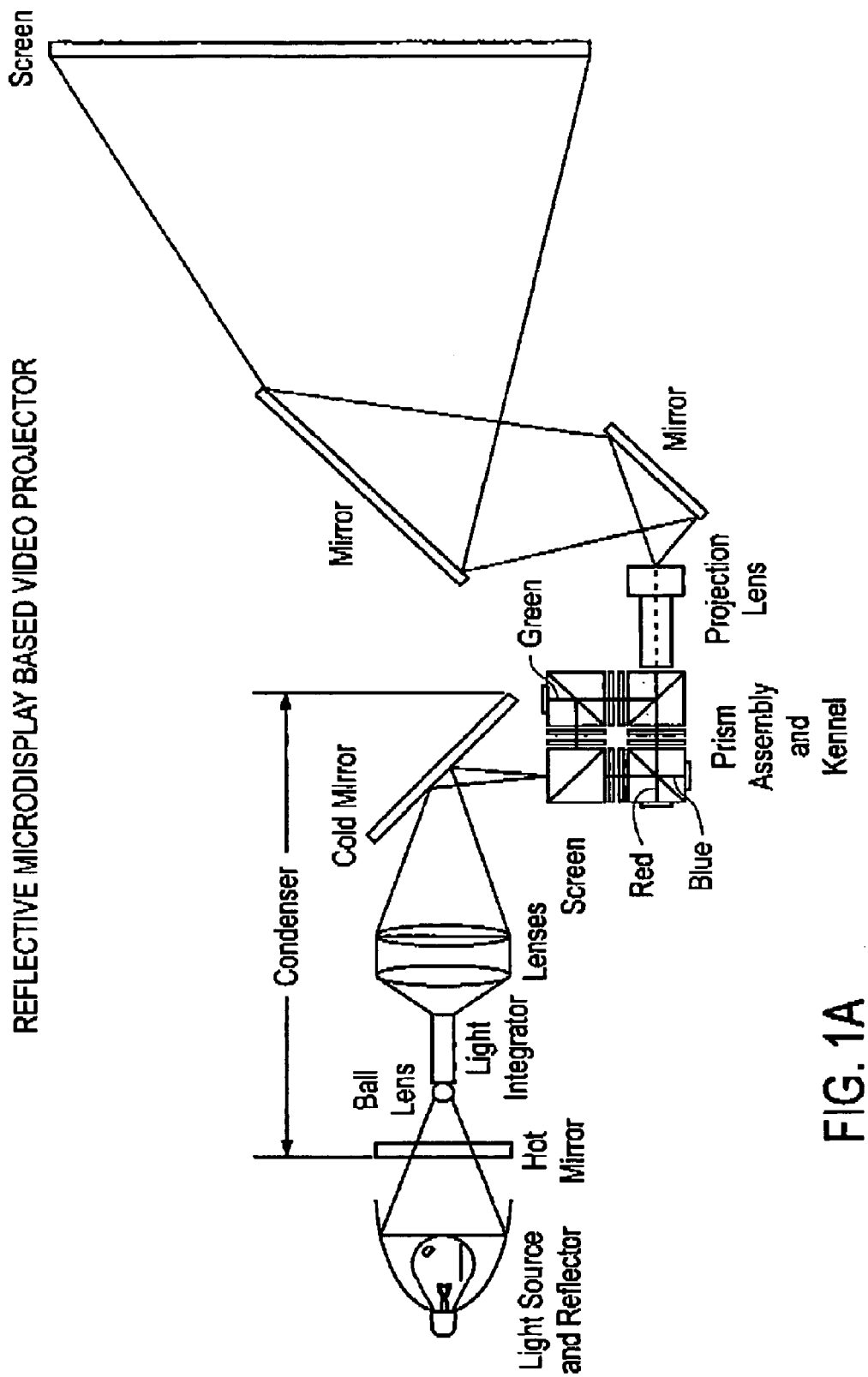
FIG. 1A is drawing of a reflective microdisplay based video projector.
Figure 1B:
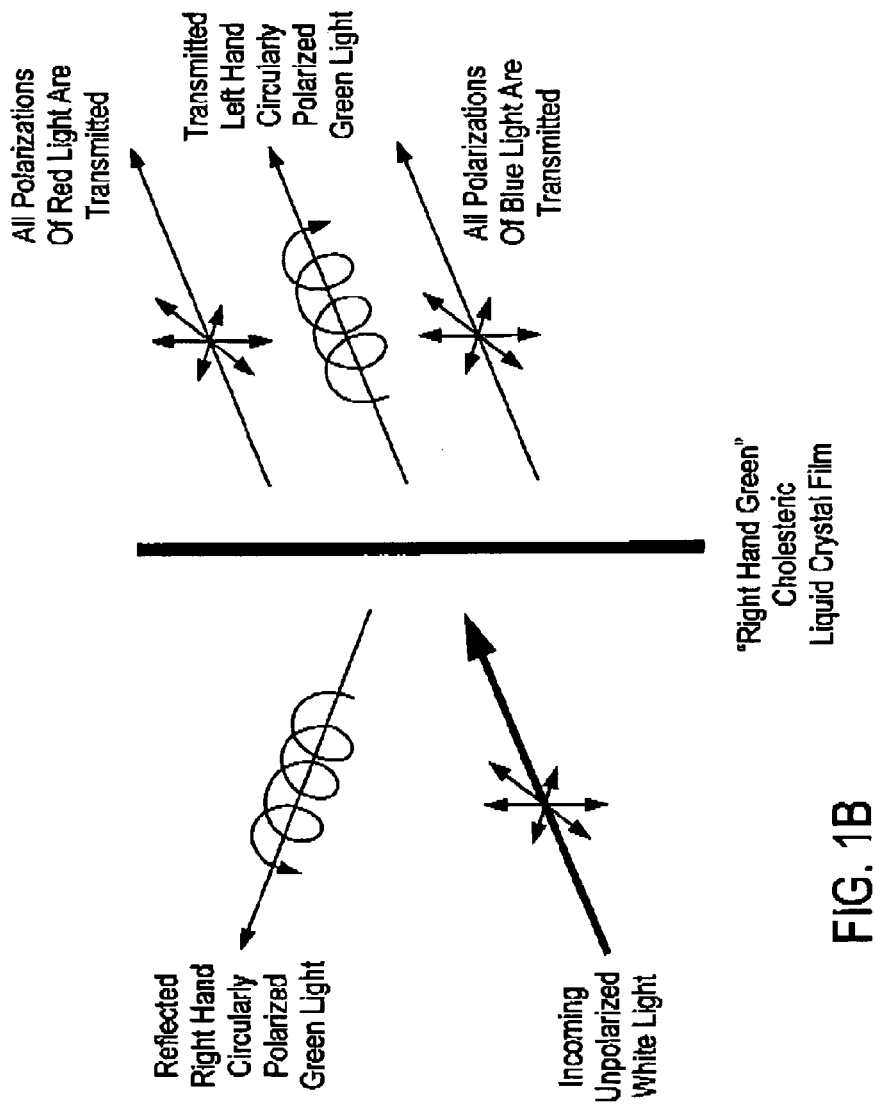
FIG. 1B is an illustration of interactions of unpolarized white light with a "right hand green" cholesteric film.

Referring again to the drawings, wherein like reference numerals designate identical or corresponding parts, and more particularly to FIG. 1B thereof, there is illustrated the interaction of unpolarized white light with various thin layers of cholesteric liquid crystal. The variation of cholesteric layer illustrated in FIG. 1B can be called "right hand green". In this case, the molecular structure of the cholesteric is such that the layer transmits green left hand circularly polarized light. Green right hand circularly polarized light is specularly reflected. Blue and red light of both polarizations are transmitted. The width of the reflective band (bandwidth) of the cholesteric material is determined as follows:

$$\Delta\lambda = (\Delta n \lambda \max)/n_{avg}$$

where $\Delta n$ is the birefringence and $n_{avg}$ the average index of refraction of the cholesteric.

λmax is the wavelength of maximum reflectivity (essentially, the center of the reflective band.). The efficiency of the reflection can be very high when the light is normally incident to the plane of the film. The efficiency decreases when the angle of incidence is off normal. In addition, the reflective maximum shifts to shorter wavelengths as the angle of observation increases.

Figure 1C:
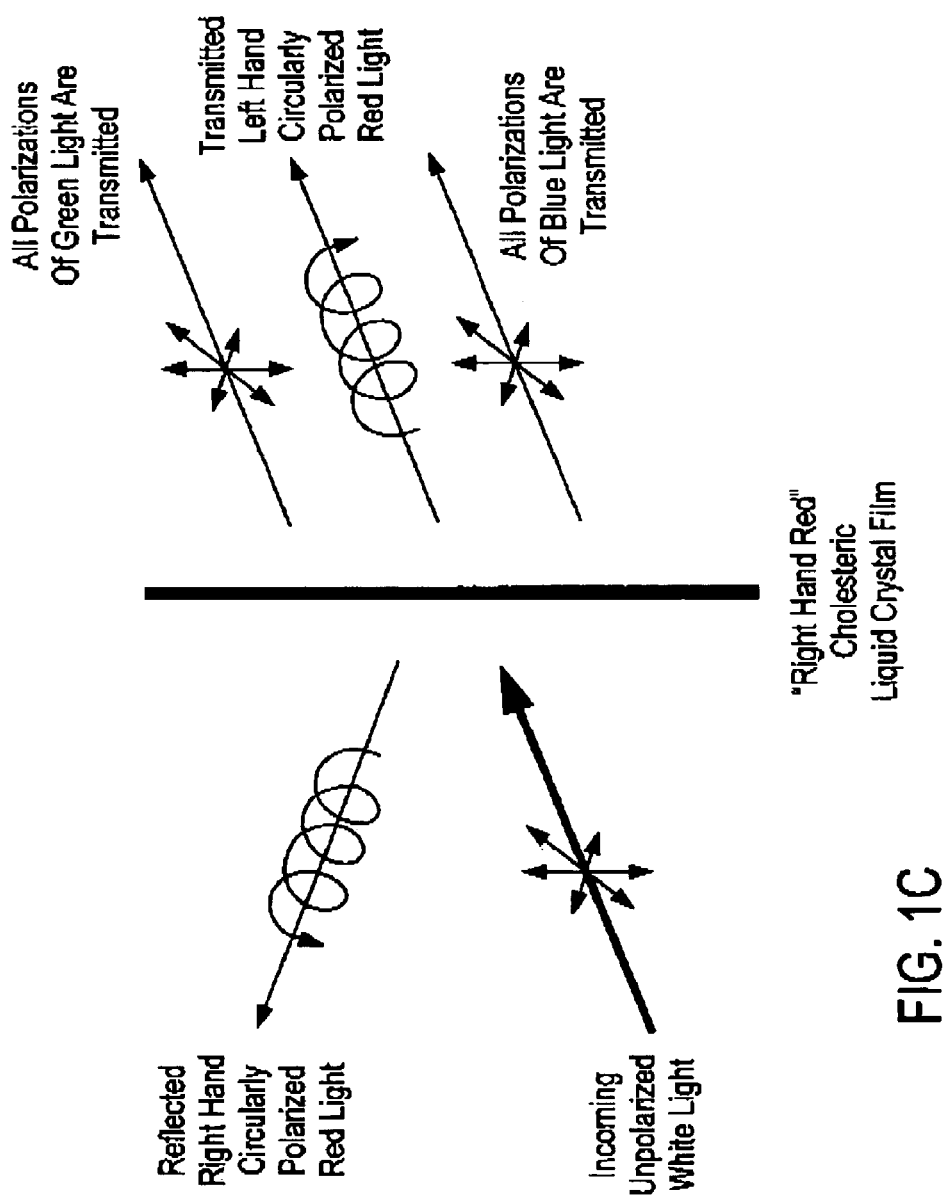
FIG. 1C is an illustration of interactions of unpolarized white light with a "right hand red" cholesteric film.

FIG. 1C illustrates the interaction of unpolarized white light with a layer of right hand, red cholesteric. As shown, all blue and green light is transmitted. Right hand red light is specularly reflected and left hand red light is transmitted.

Figure 1D:
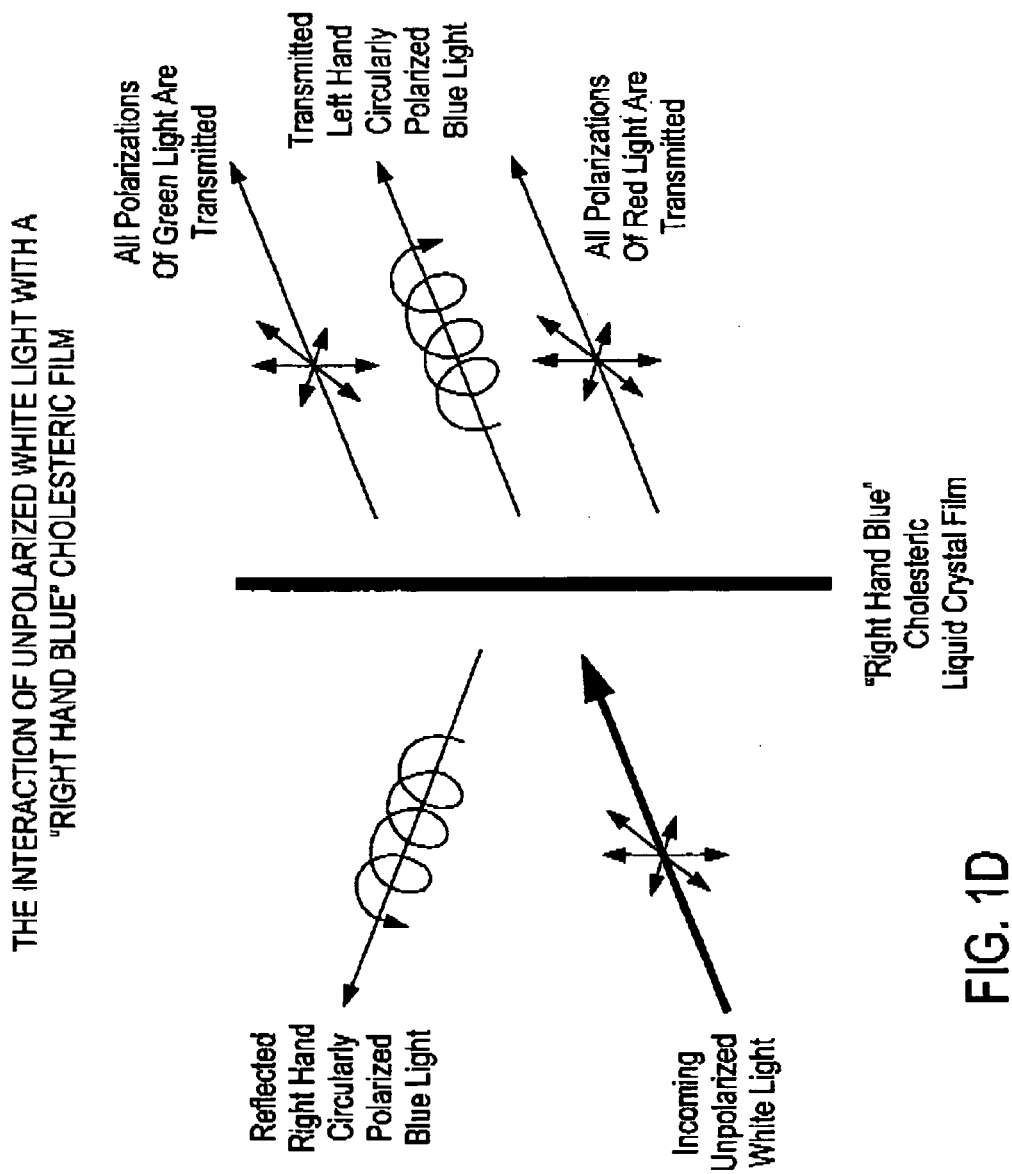
FIG. 1D is an illustration of interactions of unpolarized white light with a "right hand green blue" cholesteric film.

FIG. 1D illustrates the interaction of unpolarized white light with a layer of right hand, blue cholesteric. As shown, all red and green light is transmitted. Right hand blue light is specularly reflected and left hand blue light is transmitted.

Cholesteric layers can also be fabricated that are left-handed. In this case, left hand circularly polarized light within the appropriate bandwidth is reflected and right hand circularly polarized light is transmitted.

The cholesteric layer can be in any one of several physical forms. In the first form, the cholesteric is a fluid and must be contained between two substrates (the substrates can be cover glasses or the components in the prism assembly). The layer can also be made in the form of a polymer. It is even possible to utilize an encapsulated cholesteric in the layer.

Some current methods for producing the cholesteric layer include, for example:

A liquid precursor material is introduced into a cell (such as by vacuum filling) and then polymerized in place by exposure to UV light;

A liquid precursor material is doctor bladed onto a substrate and subsequently polymerized by exposure to UV light; and A liquid precursor material is spin coated onto a substrate and then polymerized by exposure to UV light.

Figure 2:
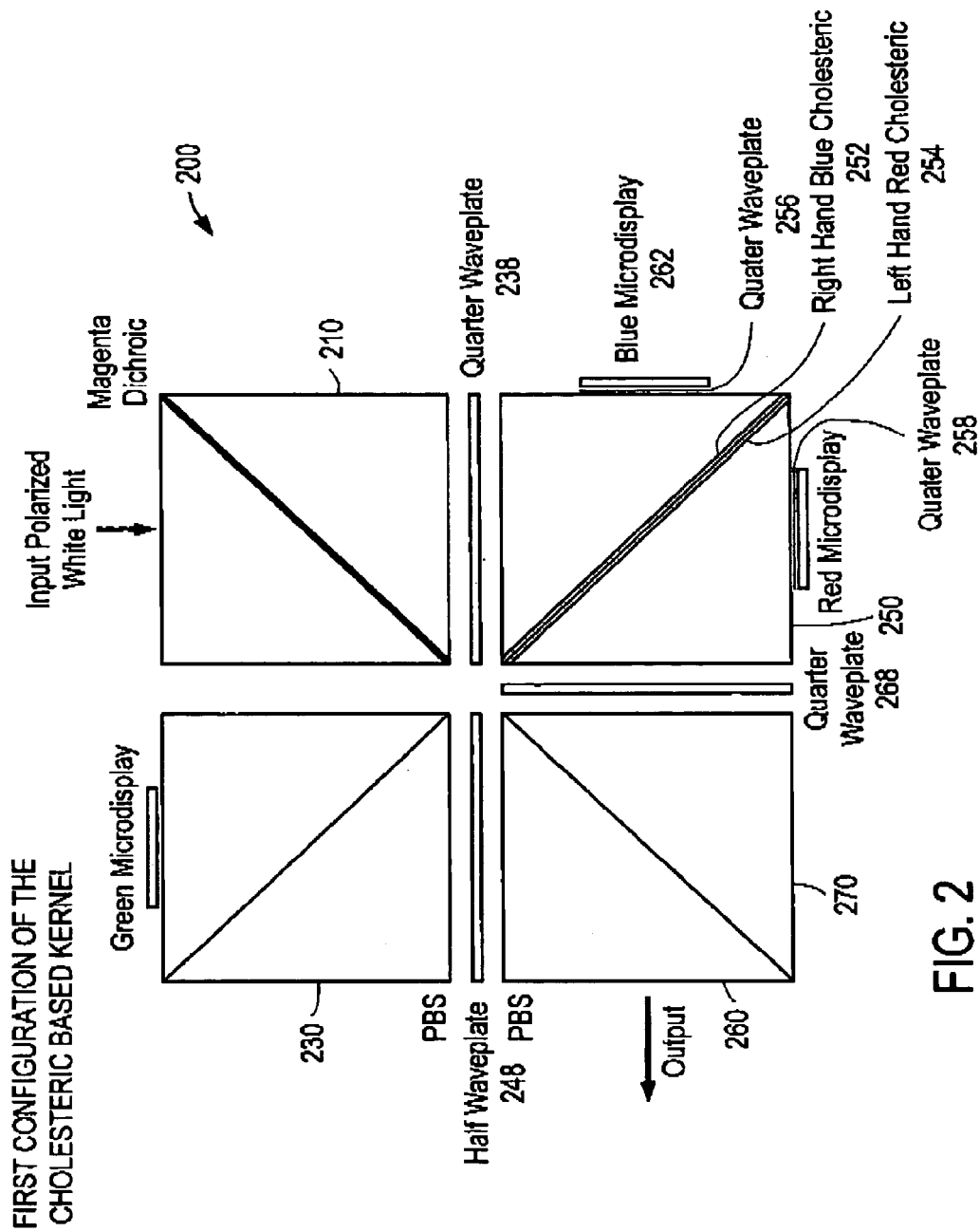
FIG. 2 is an example cholesteric based kernel according to an embodiment of the present invention.

FIG. 2 is an illustration of a new prism assembly 200 configuration in which each component is named (the prism assembly plus the microdisplays is a kernel). The prism assembly 200 includes 3 polarizing beamsplitters (PBSs) 210, 230, and 270, and a cholesteric based beam splitter (cholesteric prism) 250. Each of the beamsplitters and cholesteric prism perform a part of separating and/or combining, of the individual light paths in the prism assembly. Light entering the prism assembly is basically separated into green, blue and red light paths which are individually directed to corresponding green, red, and blue microdisplays, reflected off the microdisplays, and then combined to produce an output.

In one embodiment, the components of the prism assembly are set in pathlength matched positions. Pathlength matched may be described, for example, as light pathlengths between faces of the beam splitting components having microdisplays mounted thereon and a reference plane (e.g., exit face 260, or a focal plane in a light management system in which the prism assembly is installed) are approximately equivalent. Thus, individual light beams of each of the separate light beams corresponding to a same image pixel once reflected off the microdisplays arrive at the reference plane after traveling the same distance. And, since the pathlengths within the prism are matched (a pathlength matched prism assembly), distances traveled within the prism by the light beams reflected from the microdisplays are also the same. The prism components themselves are not precise enough, particularly in mass quantity production, to affirmatively bond the prism components directly together and end up with matched pathlengths in the prism. However, Berman et al., U.S. patent application Ser. No. 10/202,595, filed Jul. 24, 2002, entitled "Method and Apparatus for Configuration and Assembly of a Video Projection Light Management System", the contents of which are incorporated herein by reference in their entirety, describes construction of a pathlength matched prism assembly in which standard mass produced optical components may be arranged in pathlength matched positions (e.g., fixed to a plate or frame, and then spaces between the components are filled with an optical coupling fluid such as mineral oil or other commercially available index matching fluid). All of the devices and construction techniques described in the above referenced patent application may be applied to construction of prism assemblies with cholesteric based beam splitting devices.

In addition, individual beam splitting components of the prism assembly may themselves be constructed as pathlength matched beamsplitters. Construction techniques for beamsplitting devices are described in *Detro*, U.S. patent application Ser. No. 10/251,225, filed Sep. 20, 2002, entitled "Pathlength Matched Beam Splitter and Method and Apparatus for Assembly", the contents of which are incorporated herein by reference in their entirety. The techniques taught and devices described in the above referenced patent application are also applicable to the construction of a cholesteric based pathlength matched beam splitting device, such as cholesteric based beam splitter 250 if contructed as a pathlength matched beamsplitter (the polarizing element of the PBS being replaced with one or more cholesteric layers).

Figure 3:
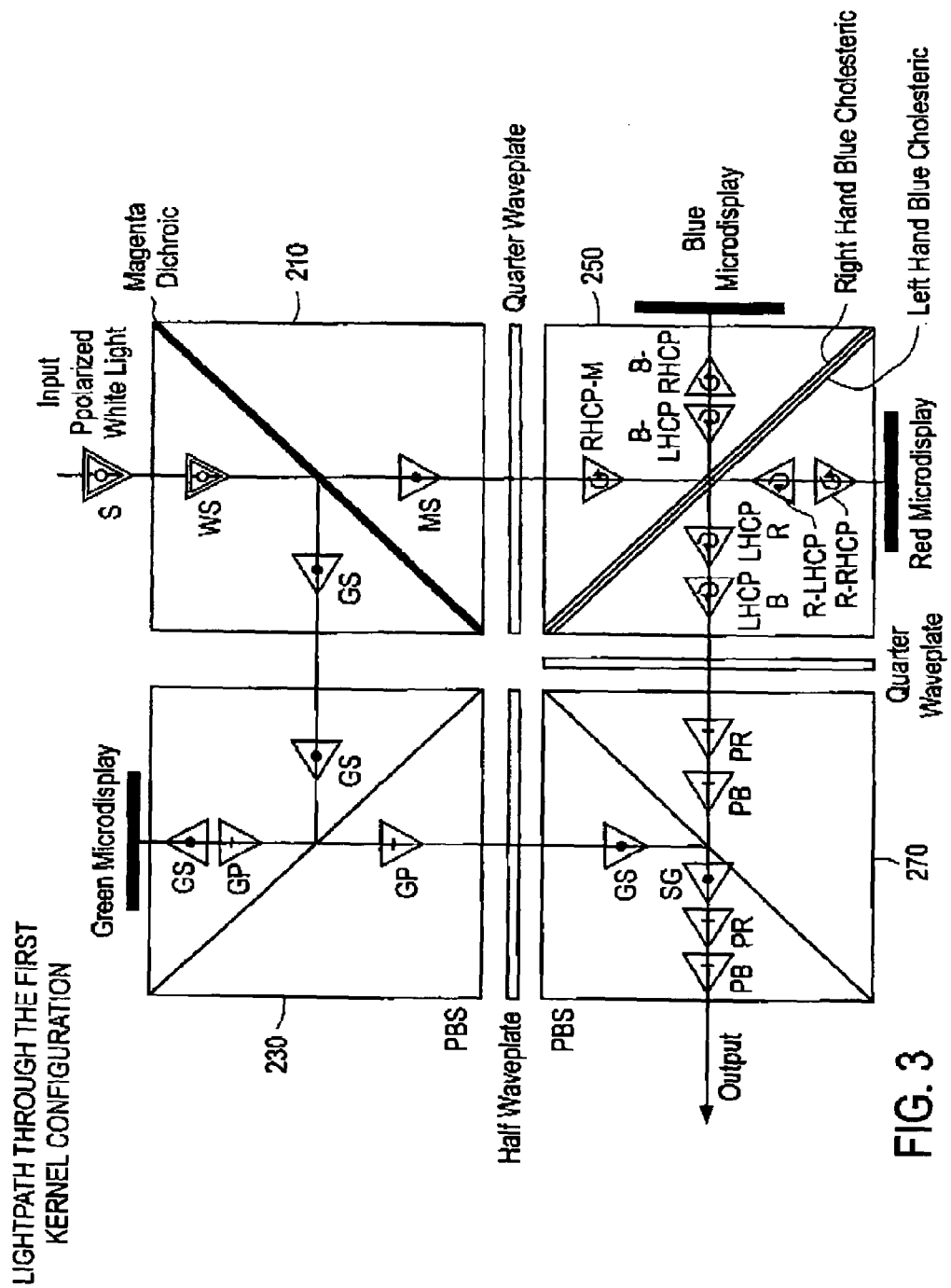
FIG. 3 is an illustration of lightpaths through the cholesteric based kernel shown in FIG. 2.

FIG. 3 illustrates the path and polarization of the light at each point within the first prism assembly configuration. PBS 210 divides the input polarized white light into GS, green s-polarized, light and MS, magenta s-polarized light after passing through the magenta dichroic. Quarter waveplate 238 converts the MS light beam to circularly polarized light RHCP-M, right hand circularly polarized—magenta.

A blue component (B-RHCP) of the RHCP-M is reflected off the right hand blue cholesteric 252 of the cholesteric based beam splitter 250 toward the blue microdisplay 262. It passes through a ¼ lambda waveplate 256 and is converted to linear polarization. Reflection off the microdisplay imposes pixel by pixel polarization modulation in the reflected beam. Upon reflection by the blue microdisplay 262, the quarter waveplate 256 reconverts the image containing blue component back to circular polarization (now left hand), B-LHCP, which then passes through both the right hand blue cholesteric 252 and the red cholesteric 254 toward the output (an additional quarter waveplate 268 is inserted to convert the light beams back to linear polarization for output).

A red component, R-RHCP, of the RHCP-M passes both of the cholesterics 252 and 254 and interacts similarly with quarter waveplate 258 and the red microdisplay 264. Upon reflection by the red microdisplay, the red component (or red light beam), now left hand circularly polarized, reflects off the left hand red cholesteric directing it toward the output. Both the red and blue light beams are recombined with the green light beam in PBS 270.

In general, there are many different combinations of polarizations and orientations of the various components discussed herein may be utilized. What is needed is a consistent set of orientations, and the main point is to use cholesterics in combination with a selected polarization to direct a specific light beam to an appropriate device that processes the light (e.g., a microdisplay).

As shown in FIG. 2, a prism assembly is illustrated that includes a cholesteric based beam splitter (cholesteric prism) 250. The cholesteric beam splitter has a blue cholesteric 252 and a red cholesteric 254. In other embodiments, the cholesterics comprise other color combinations. For example, any of blue and green cholesterics, and red and green cholesterics. Ultimately, such prism assemblies are installed in a projection device, such as a television.

Figure 4:
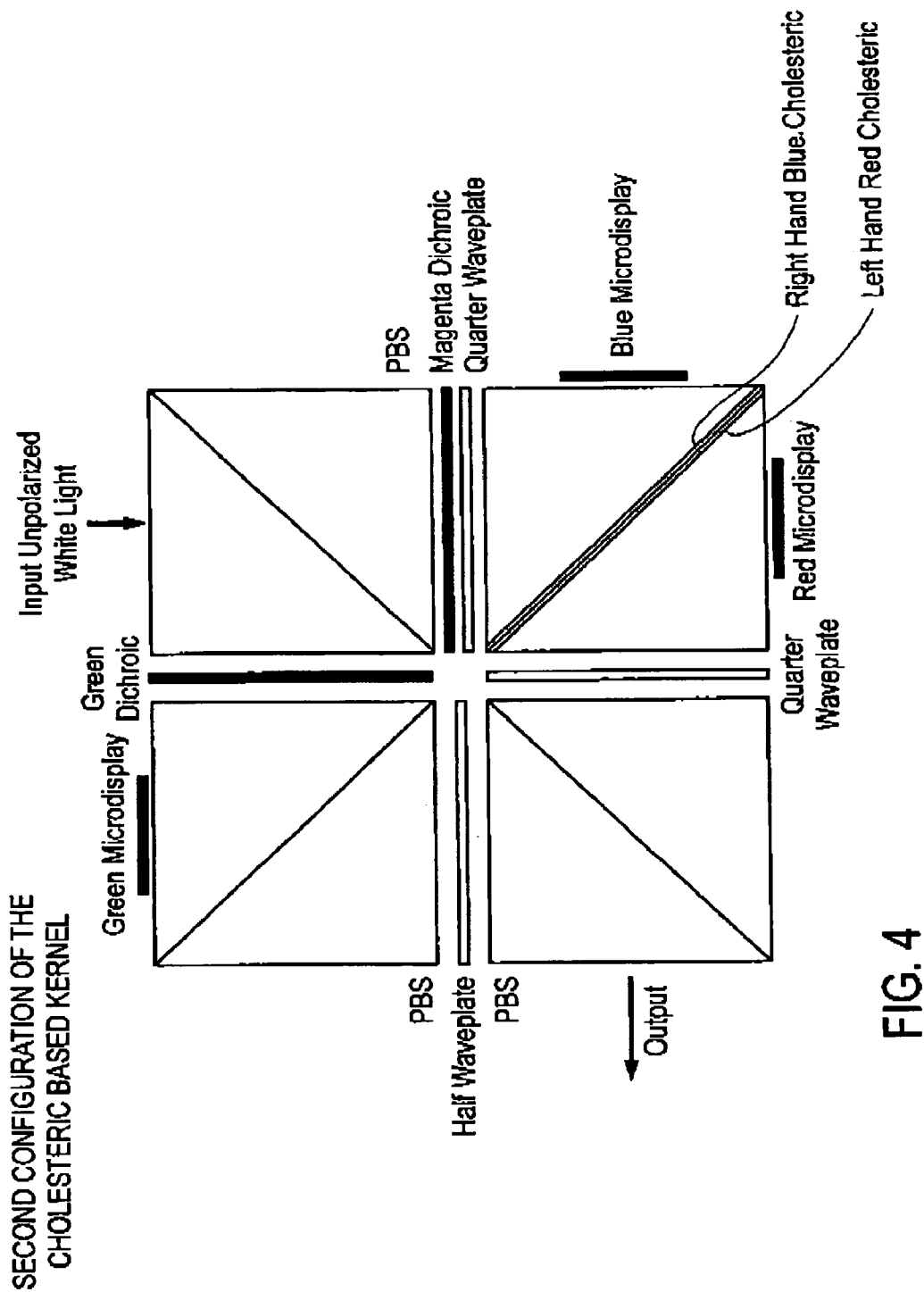
FIG. 4 is a second example embodiment of a cholesteric based kernel according to an embodiment of the present invention.
Figure 5:
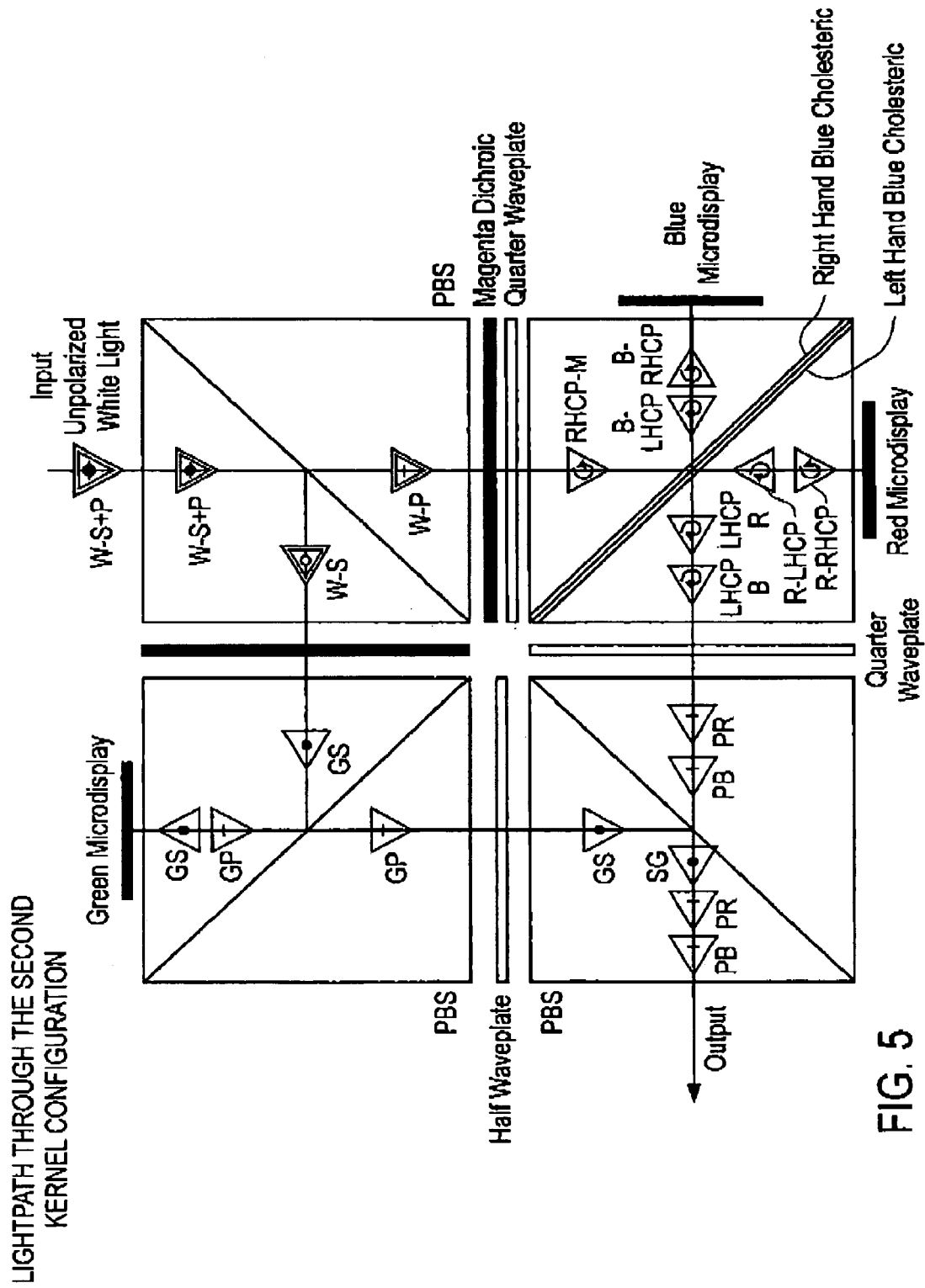
FIG. 5 is an illustration of lightpaths through the cholesteric based kernel shown in FIG. 4.

FIG. 4 is an illustration of another example prism assembly configuration. FIG. 5 illustrates the path and polarization of light at each point within the second prism assembly configuration.

Note that the illustrations indicate only the key optics in the configurations. The actual prism assembly may require additional components. More specifically, a "clean-up" polarizer can be inserted to S polarization path of the PBS to improve the contrast ratio. Preferably, this would be a reflective polarizer. In addition, "spacer glasses" can be inserted between any of the "cubes" to equalize the optical path lengths from the reflective surfaces of the microdisplays to the output face of the prism assembly.

Also note that the "joints" between the components in the optical path can be conventional, that is, a rigid adhesive. Alternately, the joints can be liquid filled as described in U.S. provisional patent application No. 60/322,490 entitled "An Improved Configuration and Means of Assembling the Light Management System used in a Microdisplay Based Video Projector" submitted September 2001, and Berman et al., U.S. patent application Ser. No. 10/202,595, filed Jul. 24, 2002, entitled "Method and Apparatus for Configuration and Assembly of a Video Projection Light Management System". A further advantage of utilizing liquid filled joints is the possibility of reducing component count by eliminating the spacer glasses by adjusting the thickness of the liquid joints. Alternately, the gaps can be "filled" with air (possibly requiring anti-reflection coatings on exposed surfaces).

An additional configuration alternative available to both prism assemblies is to replace one or more of the PBS with a reflective polarizer oriented at 45 degrees (at this time, such reflective polarizers are produced by Moxtek, Inc.). Furthermore, the magenta dichroic in the second configuration can be a flat component oriented at 45° in air rather than the illustrated cube structure. In both configurations it is possible to reduce part count by placing the dichroic films on adjacent prism component rather than placing them on separate components.

In both example configurations, the light output from the prism is linearly polarized but the green polarization direction is orthogonal to that of the red and the blue. In some video projector applications, such as those in which the screen contains a linear polarizer, it is desirable that all the light output by the prism be linearly polarized in one direction. This can be accomplished by placing a wavelength specific retarder in optical series with the output beam. (Such material is produced by ColorLink Corp and called a Color Select. It is a half waveplate in the green portion of the spectrum and a 0 or 1 lambda retarder in the red and blue portion of the spectrum.)

Note that configurations can be adjusted so that the prism assemblies can accept not only unpolarized input light but also light that is either linearly or circularly polarized. This is accomplished by the placing an appropriate waveplate at the input to the kernel.

A comment related to the cholesteric layer. Since the nominal light ray is incident on the cholesteric layer at 45 degrees, the center wavelength of the cholesteric (λmax) should be chosen such that the shift towards the blue places the reflective/polarizing band of the cholesteric at the desired portion of the spectrum.

In describing the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing cholesteric composed of a layer of cholesteric film, any other equivalent device, such as a cholesteric liquid embedded between layers of glass, or another device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to prisms, optical elements, depositions, films, encapsulated materials, fittings, air gaps, spacer elements, angles of incidence, re-arrangement or alternative placement of materials, etc should also be consider considered in light of any and all available equivalents.

In light of the above teachings, numerous modifications and variations of the present invention are possible and will be apparent to the ordinarily skilled artisan. And, appended hereinbelow are a number of embodiments in which the invention may be practiced. However, it should be understood that within the scope of the appended embodiments, the invention may be practiced otherwise than as specifically described. Furthermore, the scope of any non-provisional patents that issue from this provisional application should only be limited by claims as then presented in each corresponding non-provisional patent application, and not be interpreted, affected, or limited from any embodiments or example claims that may be presented herein.

What is claimed is:

1. A prism assembly, comprising:
an input beam splitter comprising an input face, a first exit face, and a second exit face;
a processing beam splitter comprising an input face and an exit face, wherein the input face of the processing beam splitter is coupled to the first exit face of the input beam splitter;
a cholesteric based beam splitter comprising an input face and an exit face, wherein the input face of the cholesteric based beam splitter is coupled to the second exit face of the input beam splitter; and
an output beam splitter having a first input face, a second input face, and an output face, wherein the first input face of the output beam splitter is coupled to the exit face of the processing beam splitter and the second input face of the output beam splitter is coupled to the exit face of the cholesteric beam splitter
wherein:
the cholesteric beam splitter comprises a dual cholesteric layer configured to,
direct a first part of a light beam entering the input face of the cholesteric based beam splitter to a first processing face of the cholesteric beam splitter,
direct a second part of the light beam entering the input face of the cholesteric based beam splitter to a second processing face of the cholesteric beam splitter, and
direct light beams emanating from the first and second processing faces to the exit face of the cholesteric based beam splitter.

2. The prism assembly according to claim 1, wherein:
the output beam splitter is configured to direct light beams entering the first input face of the output beam splitter and light beams entering the second input face of the output beam splitter to the exit face of the output beam splitter.

3. The prism assembly according to claim 1, wherein the input beam splitter, the processing beam splitter, the cholesteric based beam splitter, and the output beam splitter are arranged in a cube.

4. The prism assembly according to claim 2, further comprising a quarter waveplate placed in a lightpath between the input beam splitter and cholesteric based beam splitter and configured to circularly polarize light entering the input face of the cholesteric based beam splitter.

5. The prism assembly according to claim 4, wherein:
the quarter waveplate is a right hand circular polarizer; and
the blue and red cholesterics are mounted at 45 degrees to the lightpath and are reflective of light having different polarizations.

6. The prism assembly according to claim 5, wherein one of the cholesterics is reflective of right hand polarized light and the other cholesteric is reflective of left hand polarized light.

7. The prism assembly according to claim 4, further comprising an additional quarter waveplate positioned in each lightpath directed by a cholesteric.

8. A prism assembly, comprising:
an input beam splitter comprising an input face, a first exit face, and a second exit face;

a processing beam splitter comprising an input face and an exit face, wherein the input face of the processing beam splitter is coupled to the first exit face of the input beam splitter;

a cholesteric based beam splitter comprising an input face and an exit face, wherein the input face of the cholesteric based beam splitter is coupled to the second exit face of the input beam splitter; and an output beam splitter having a first input face, a second input face, and an output face, wherein the first input face of the output beam splitter is coupled to the exit face of the processing beam splitter and the second input face of the output beam splitter is coupled to the exit face of the cholesteric beam splitter wherein:

the cholesteric based beam splitter comprises a beam splitting component comprising two cholesteric layers; and the cholesteric layers comprises a blue cholesteric for directing blue light to a first processing face of the cholesteric based beam splitter and a red cholesteric for directing red light to a second processing face of the cholesteric based beam splitter.

* * * * *